UNITED STATES PATENT OFFICE.

HANS BUCHERER, OF BIEBRICH, GERMANY, ASSIGNOR TO THE FIRM OF KALLE & COMPANY, AKTIENGESELLSCHAFT, OF BIEBRICH, GERMANY.

AMINO-OXY-NAPHTHALENE SULFONIC ACID AND PROCESS OF MAKING SAME.

1,022,019.     Specification of Letters Patent.     Patented Apr. 2, 1912.

No Drawing.     Application filed May 4, 1910. Serial No. 559,399.

*To all whom it may concern:*

Be it known that I, HANS BUCHERER, doctor of philosophy, chemist, subject to the King of Prussia, and residing at Biebrich-on-the-Rhine, Germany, have invented certain new and useful Improvements in the Manufacture of Amino-Oxy-Naphthalene Sulfonic Acid and Processes of Making Same, of which the following is a specification.

The 2-amino-naphthalene-1.5-disulfonic acid

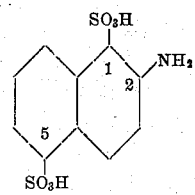

obtainable from 2-amino-naphthalene-1-sulfonic acid by further sulfonation (see *Proceedings of the Chemical Society* 11 (1895) page 238) has found technical applications in many directions. Fusing of the 2-amino-naphthalene-1.5-disulfonic acid is not however known, unless the conversion of the diazotized acid into the 2-diazo-1-oxynaphthalene-5-sulfonic acid be considered as a kind of fusion with extraordinarily mild agents (see German specification 145906).

It has now been found that the alkali melt of the 2-amino-naphthalene-1.5-disulfonic acid or its salts takes place in a manner quite different from that which was to be expected from past experience. If the proper conditions be observed, an acid is produced which is a very valuable product and which may, from its properties, be considered to be 2-amino-5-oxynaphthalene-1-sulfonic acid having probably the following constitution

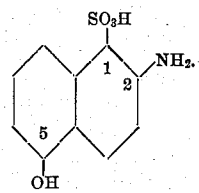

The fusing of the 2-amino-naphthalene-1.5-disulfonic acid takes place with greater difficulty than is the case with those naphthyl-amino-disulfonic acids in which there is, in the meta position to the alpha-sulfonic group, another sulfonic group, as is the case, for instance, with 1-amino-naphthalene-5.7-, the 2-amino-naphthalene-5.7- and the 2-amino-naphthalene-6.8-disulfonic acid. It is preferable in the present case to select a somewhat stronger alkali, than is usual for the fusion of the aforesaid disulfonic acids.

The following example illustrates the manner in which the invention may be carried out, but it is not limited thereto: 800 kilograms of caustic potash are heated to 150° centigrade without the addition of water. Then, while stirring the mass, 400 kilograms of a 60 to 50 per cent. compressed cake of the sodium salt of 2-amino-naphthalene-1.5-disulfonic acid are introduced thereinto and, after the introduction is completed, the mass is heated further to from 210°, to 230° centigrade. The melt at once assumes a pronounced yellow color, becomes gradually somewhat darker and finally becomes a perfectly thin liquid. In about half an hour the melting is completed and the 2-amino-5-oxy-naphthalene-1-sulfonic acid can be worked up in the usual manner. The smooth progress of the fusing operation is not limited to the hereinbefore named quantities nor to the use of caustic potash. The melt can, if desired, be carried on in a closed vessel.

The hereinbefore given constitution of the new acid results first of all from the property possessed by this acid, to smoothly couple with diazo compounds in a solution alkaline with soda. If the combination be effected in the presence of dilute acid coloring matters are obtained which differ from those obtained in alkaline solution not only as regards their shade, but also as regards their difficult solubility, from which it appears that the acid combines, in the 1-position, and elimination of the sulfonic group takes place, that is, it gives directly coloring matters of 2-amino-5-oxy-naphthalene. The acid is difficultly soluble in cold water, and fairly easily soluble in hot water from which it crystallizes, after cooling, sometimes in fine small needles, and sometimes in more, firm, compact crystals which are partly grouped star-wise. Sometimes the acid separates only slowly and assumes a gelatinous consistency before becoming crystalline. In alkaline solution the acid gives a conspicuous light greenish fluorescence. It can be converted in the usual manner into acyl and alkyl, aryl, or aralkyl, derivatives and also in carbazol derivatives (see German specification 208960).

In combining the new acid with diazo compounds, I have found, that coloring matters are obtained distinguished by the striking brilliancy of their shade up to now not obtainable with the derivatives of the 1.5-naphthol-sulfonic acid.

No claim is herein made to the dyes or coloring matters obtainable by use of the new acid herein described and claimed as such invention forms the subject-matter of a divisional application filed July 7, 1911.

What I claim is:

1. The manufacture of an amino-oxynaphthalene sulfonic acid by subjecting the 2-amino-naphthalene-1.5-disulfonic acid to alkaline fusion.

2. The new amino-oxynaphthalene sulfonic acid obtainable by alkaline fusion of the 2-amino-naphthalene-1.5-disulfonic acid, of probably the following structural formula

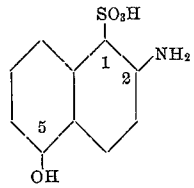

which crystallizes from its solution in hot water in white needles difficultly soluble in cold water and which yields soluble azo colors on combination with a diazo body in alkaline solution and difficultly soluble azo colors when combined with a diazo body in an acid solution.

In testimony whereof I have signed my name to this specification in the presence of two subscribing witnesses.

HANS BUCHERER.

Witnesses:
HERMANN PLISCHESE,
MAX ZIESCHE.

---

Copies of this patent may be obtained for five cents each, by addressing the "Commissioner of Patents, Washington, D. C."